United States Patent [19]
Wallace

[11] 4,118,282
[45] Oct. 3, 1978

[54] PROCESS AND APPARATUS FOR THE DESTRUCTIVE DISTILLATION OF HIGH MOLECULAR WEIGHT ORGANIC MATERIALS

[75] Inventor: Floyd D. Wallace, Leslie, Mich.

[73] Assignee: Wallace Energy Conversion, Inc., Charlotte, Mich.

[21] Appl. No.: 824,559

[22] Filed: Aug. 15, 1977

[51] Int. Cl.² .......................... C10J 3/00; C10B 7/08; C07C 15/10; C10B 57/02

[52] U.S. Cl. ...................................... 201/2.5; 48/111; 48/209; 201/25; 201/30; 201/41; 202/105; 202/120; 208/8

[58] Field of Search ...................... 201/2.5, 25, 30, 41; 48/111, 209; 202/105, 120; 208/8

[56] References Cited

U.S. PATENT DOCUMENTS

| | | | |
|---|---|---|---|
| 2,603,741 | 7/1952 | Seigfried et al. | 201/2.5 X |
| 3,029,558 | 8/1974 | Banks et al. | 201/25 X |
| 3,148,227 | 9/1964 | Hearon et al. | 48/209 X |
| 3,449,213 | 6/1969 | Knapp et al. | 201/30 X |
| 3,480,529 | 11/1969 | Waltrip | 210/19 X |
| 3,497,005 | 2/1970 | Pelopsky et al. | 166/247 |
| 3,503,865 | 3/1970 | Stone | 208/8 X |
| 3,625,884 | 12/1971 | Waltrip | 210/19 |
| 3,702,039 | 11/1972 | Stookey et al. | 201/25 X |
| 3,719,454 | 3/1973 | Shang | 23/200 S X |
| 3,843,457 | 10/1974 | Grannen et al. | 201/2.5 |
| 3,984,208 | 10/1976 | Yoshida et al. | 201/2.5 |
| 4,052,265 | 10/1977 | Kemp | 201/2.5 |

FOREIGN PATENT DOCUMENTS

| | | | |
|---|---|---|---|
| 12,440 | 3/1928 | Australia | 208/8 |
| 708,763 | 7/1941 | Fed. Rep. of Germany | 208/11 |
| 2,422,256 | 11/1974 | Fed. Rep. of Germany | 201/2.5 |
| 321,910 | 11/1929 | United Kingdom | 208/8 |
| 671,922 | 5/1952 | United Kingdom | 21/54 A |
| 1,452,037 | 10/1976 | United Kingdom | 48/209 |

OTHER PUBLICATIONS

Boucher, RMG.; "Advances in Sterilization Techniques, . . .", A. J. of Hospital Pharmacy; vol. 29; 8/72; pp. 660–672.

"Sonic Energy Attaining Majority in Chemical Processing"; Chemical & Engr. News; vol. 28, No. 24, 6/12/50, pp. 2002–2003.

*Primary Examiner*—Barry S. Richman
*Attorney, Agent, or Firm*—Ian C. McLeod

[57] ABSTRACT

A process and apparatus for the destructive distillation of high molecular weight organic materials such as organic wastes, particularly those containing hydrocarbon groups, using ultrasonic and microwave generators together to irradiate, and molecularly disperse the organic molecules in the organic materials. At least initially a portion of the organic materials are preferably irradiated with a laser beam or other initiator to initiate molecular motion in the organic materials and produce elemental carbon in situ from the organic materials so that the process will begin rapidly. Carbon and/or particulate catalysts which promote or increase the absorption of microwaves are preferably admixed with the organic materials. Also described are condenser means for removal of oily higher molecular weight volatilization products and water electrolysis means for providing oxygen for the oxidation of carbon materials in the volatilization products and to provide hydrogen in the gaseous volatilization products in order to provide clean gaseous volatilization products having a high fuel value. Charcoal, tars, resins and pure carbon are also by-products of the process.

22 Claims, 2 Drawing Figures

PROCESS AND APPARATUS FOR THE DESTRUCTIVE DISTILLATION OF HIGH MOLECULAR WEIGHT ORGANIC MATERIALS

DESCRIPTION OF THE INVENTION

The present invention relates to a destructive distillation process and apparatus whereby high molecular weight organic materials such as organic wastes are converted or cracked into useful products including oils, burnable gases and charcoal. The present invention particularly relates to a process and apparatus for converting garbage, tires and other wastes into useful products using microwave and ultrasonic waves to irradiate the wastes in the presence of elemental carbon.

PRIOR ART

The prior art has described pyrolytic processes for the high temperature destructive or cracking distillation of a variety of high molecular weight organic materials. The processes are conducted under non-oxidizing conditions to prevent the destruction of the volatilization products. Relatively expensive high temperature equipment is needed for these processes and energy to heat the wastes is absorbed with only a relatively low efficiency. Illustrative of this prior art is U.S. Pat. No. 3,702,039 to Stookey et al.

U.S. Pat. No. 3,843,457 to Grannen et al describes a process where microwaves are used to destructively distill high molecular weight organic materials in the form of solid wastes and thus this patent is directly related to the process of the present invention. In this process, shredded wastes are irradiated with the microwaves in a zone and then are conveyed out of the zone along with the volatilization products in a gas stream. The effect of the microwaves on the polar bonds, particularly carbon oxygen bonds in carbohydrates, in cracking high molecular weight organic materials and the equipment used is described in detail. A gas stream having a high flow rate is used in the process to assure that the destructive distillation products are rapidly removed from the microwave irradiating zone in order to prevent more complex (or oil) molecules formed from being re-cracked. The problem with this process is that relatively large volumes of carrier gases are needed to accomplish the result.

OBJECTS

It is therefore an object of the present invention to provide an improved process utilizing a microwave generator which does not require a carrier gas stream to remove the gaseous volatilization products and yet provides significant amounts of cracked high molecular weight or oily products. It is also an object of the present invention to provide a process which is simple to perform and apparatus which is economical to construct by comparison to prior art pyrolysis processes. These and other objects will become increasingly apparent by reference to the following description and to the drawings.

IN THE DRAWINGS

GENERAL DESCRIPTION

Figure 1:
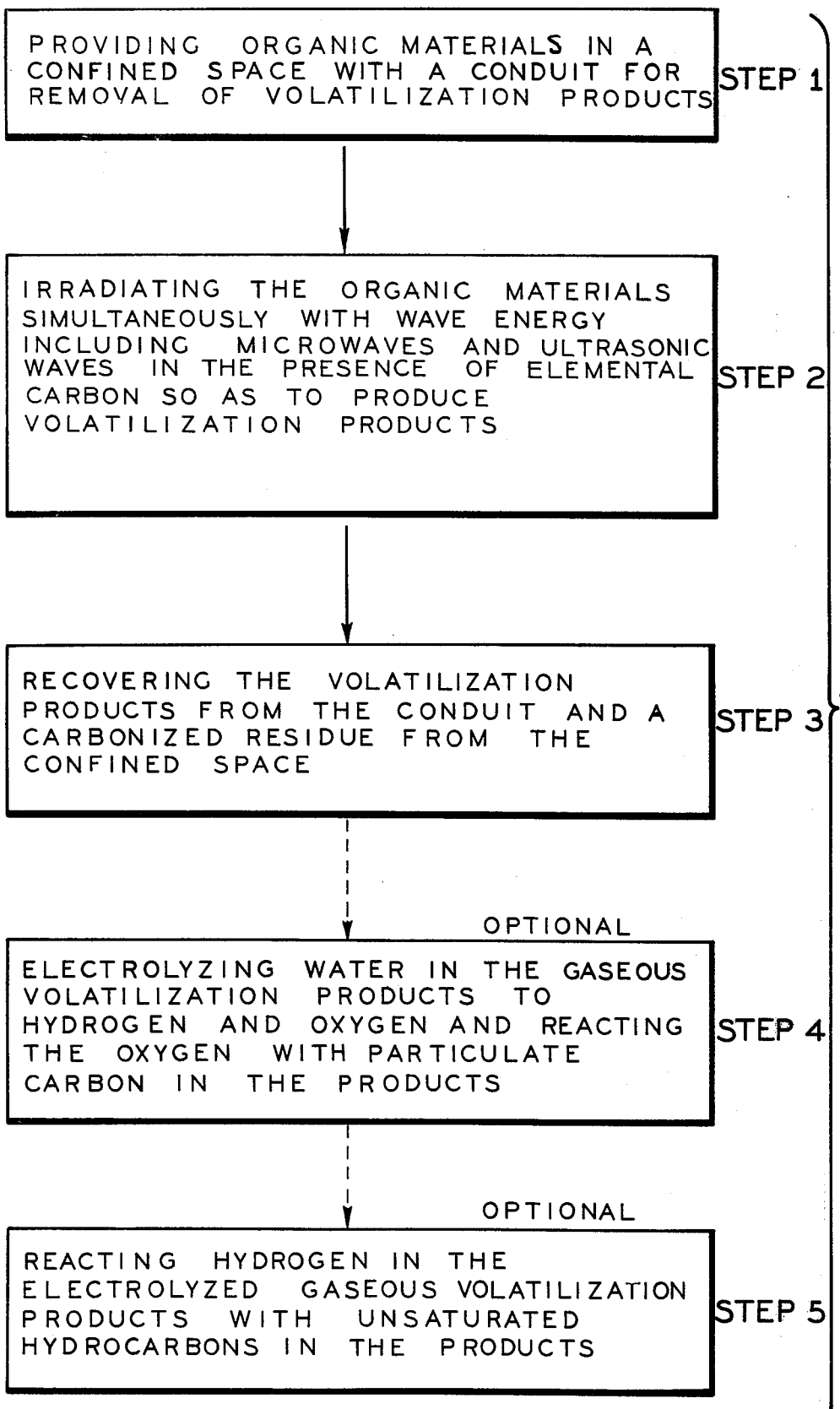
FIG. 1 is a block flow diagram describing the process of the present invention.

The present invention relates to the process for the destructive distillation of high molecular weight organic materials to produce volatilization products which comprises: providing high molecular weight organic materials in a confined space irradiatable by multiple wave energy sources including microwave and ultrasonic generators as the wave energy sources and with a conduit connected to an outlet from the confined space for removal of volatilization products; irradiating the organic materials simultaneously with the multiple wave energy sources in the presence of elemental carbon in an amount sufficient to produce an electrical discharge in the confined space so as to initiate the formation of volatilization products by destructive distillation of the organic materials; and recovering the volatilization products from the conduit and a carbonized residue from the confined space. The present invention also relates to the apparatus useful for the destructive distillation of high molecular weight organic materials into gaseous volatilization products which comprises: a chamber defining a confined space including a cover for introducing and then sealing the organic materials in the confined space; an outlet connector from the chamber for attachment of a conduit for removal of the volatilization products from the confined space; and generators in association with the chamber for providing wave energy in the confined space including ultrasonic and microwave generators, wherein the combined wave energy of the ultrasonic and microwave generators is sufficient to produce destructive distillation of the organic materials in the presence of elemental carbon. As used herein, the term "gaseous volatilization products" includes true gases as well as liquids and solids entrained in the gas. As indicated hereinafter, there are higher molecular weight cracked compounds which can be recovered as oils and particulate carbon in the products of the process. FIG. 1 illustrates the steps of the process.

Elemental carbon is initially present in the high molecular weight materials to be treated or it is generated in situ in the materials by the action of the preferred laser generator as described in detail hereinafter, or another initiator, such as a spark discharge device. Preferably the elemental carbon is heated which occurs with a laser. As microwaves move through a high molecular weight organic material including elemental carbon, which is conductive, there is a difference of electrical potential developed in the carbon in line with the microwave peaks and valleys. The resultant induced charges in the carbon are of such an electrical potential as to cause an electrical discharge between isolated or separated carbon atoms. This phenomenon can be demonstrated by placing a pencil lead or carbon pieces in line with each other and separated by a small distance and the charges induced by the microwaves will be sufficient to start and maintain an electrical discharge from one piece to the other. In fact, such an electrical arcing device can be used as an initiator for the process of the present invention. As the destructive distillation progresses in the organic materials, more and more elemental carbon atoms are produced from the organic materials, which makes the entire process self supporting or autogenetic. The result is an effective breakdown of all of the organic materials with a minimum of energy input. The heat energy necessary to break down the non-conducting organic materials (plastic, rubber, paper, etc.) appears to be more directly supplied by the electrical discharge in situ rather than by direct absorption of the microwaves; however, both routes to destructive distillation are possible.

Microwave generators are well known to those in the prior art. Microwaves have a wave frequency between about 300 megaHertz and 300 gigaHertz and are preferably variably powered at between about 100 and 1500 watts. Commercially available units have a wave frequency of 915 or 2450 megaHertz. The microwave energy is sufficient to crack or rupture bonds in the high molecular weight material in the presence of elemental carbon.

An important preferred feature of the process of the present invention is the use of a catalytic amount of particles which increase the microwave absorptivity of the high molecular weight organic materials. Included are aluminum silicates which occur in clays for instance and which adsorb portions of the waste and increase microwave absorptivity as well as particulate metals and carbon which are conductive. Suitable elemental conductive catalysts are for example gold, platinum, carbon. The particle size is not important so long as the absorbed microwave energy is transferred to the organic materials. A level of about 0.1 to 2.0 percent by weight of catalyst is usually added to the organic material.

Ultrasonic generators are also well known to the prior art. Ultrasonic waves have a frequency of at least about 20 kiloHertz. One important function of the ultrasonic waves is to provide for rapid extraction of gaseous volatilization products from the mass being treated so that these products have only a limited exposure to the microwaves. Thus oils are produced in significant amounts rather than being cracked in situ. The ultrasonic waves can act on the high molecular weight organic materials directly or indirectly by means of gases in contact with the organic materials to achieve this result. Without ultrasonic waves, the process of the present invention does not function satisfactorily.

The laser light beam preferably initiates the reaction of the organic material mass so that the distillation proceeds progressively in the desired manner. A point volatilization of a thin section of a solid organic material by absorption of the light occurs where the beam strikes the organic material to generate elemental carbon which selectively starts the reaction. Laser beams are powered to between 1 milliwatt and 1500 watts and have a frequency between 50 Hertz and 500 kiloHertz and can be powerful enough to cut or penetrate solid materials. Laser generators are well known to the prior art. Usually the laser beam is deactivated after gaseous volatilization. Other initiators which produce elemental carbon in situ can also be used, such as an electrical discharge.

Generally a portion of the gaseous volatilization products which have a relatively high molecular weight (oils) are recovered as liquids in condensers upon removal from exposure to the microwaves. Such equipment is well known to the prior art.

One problem encountered in microwave destructive distillation by the process of the present invention is the presence of "soot" or unreacted particulate carbon because of the rapid removal of the volatilization products from microwave irradiation. This carbon can be recovered in known particle precipitators such as electrostatic precipitators and used in the process or it can be burned along with the other volatilization products.

The present invention also provides a unique solution to this problem by electrolyzing water present in the gaseous volatilization products to hydrogen and oxygen, so that the resulting oxygen generated reacts with the carbon and some of the carbon monoxide present. The hydrogen produced remains in the gaseous volatilization products to significantly increase the fuel value. A portion of the hydrogen can also be reacted in a catalytic converter with unsaturated hydrocarbons which can be present in the gaseous volatilization products. Generally water is condensed in the electrolysis unit to provide a conductive path between electrodes where the hydrogen and oxygen form. Hydrogen chloride and other volatile acids from the destructive distillation are absorbed in this solution and act to provide a conductive solution for the electrolysis. It is also possible to electrolyze water vapor (steam) under these conditions in the electrolysis unit.

The process operates at its highest efficiency at reduced pressures created by a pressure reducing means such as a vacuum pump, a steam ejector or the like. The reduced pressures also allow the gaseous volatilization products to be removed as rapidly as possible from the irradiation zone in order to limit the extent of cracking. The preferred reduced pressure is about 27 inches of Hg (0.03 atmosphere) or less.

The following is a generalized description of the apparatus of the present invention. It will be appreciated that there is a wide variety of hardware readily available or easily assembled for construction of the apparatus.

Figure 2:
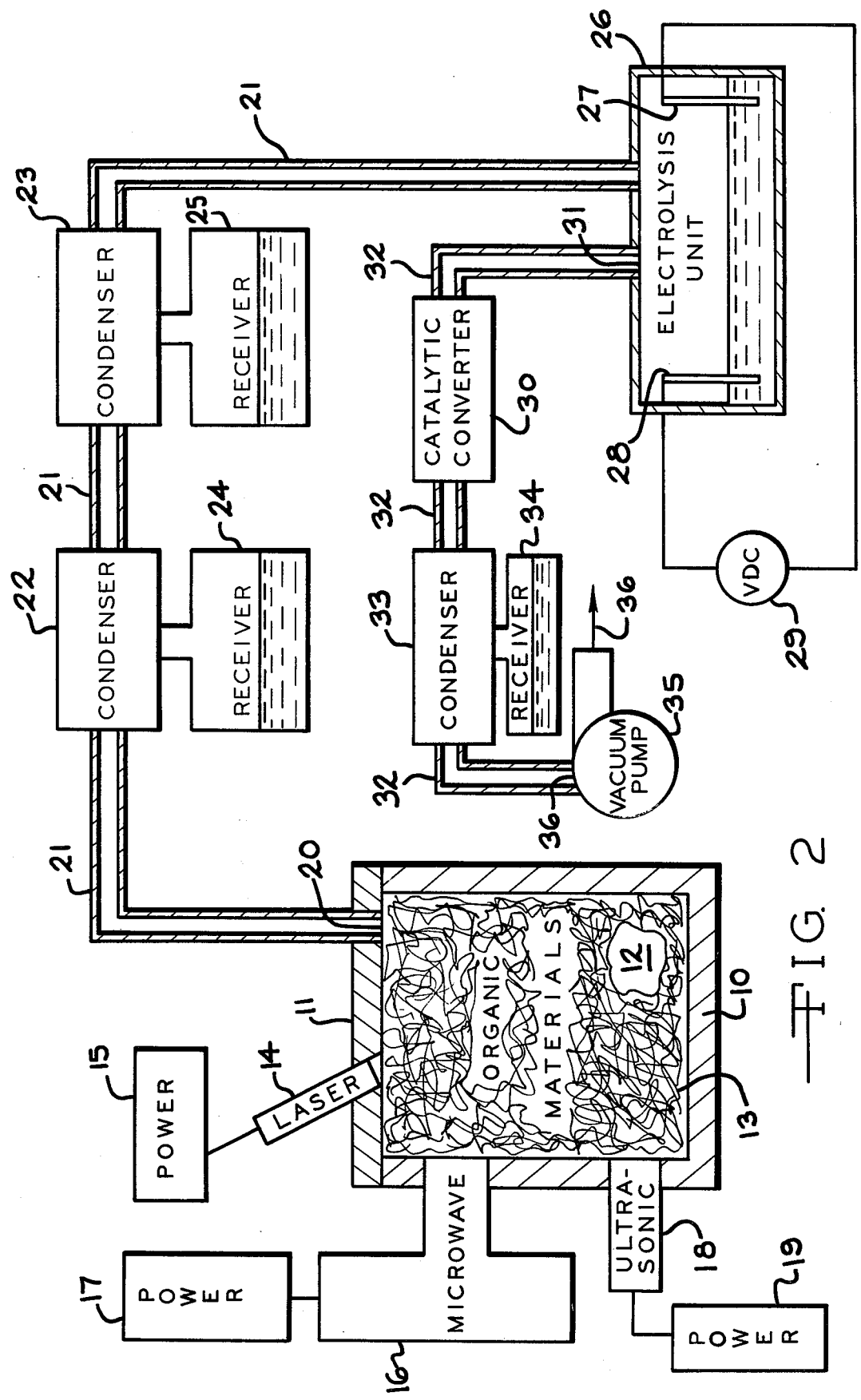
FIG. 2 is a schematic illustration of a preferred apparatus used in the process of the present invention.

FIG. 2 shows a schematic illustration of a preferred apparatus to be used in practicing the process of the present invention. In particular a chamber 10 with a cover 11 having a clamping means (not shown) defines a confined space 12, which contains a high molecular weight organic material 13. A lower cover (not shown) can be provided for gravity dumping of carbon containing residues from the chamber 10. Multiple wave energy sources including a laser beam generator 14 with a power source 15; a microwave generator 16 with a power source 17; and an ultrasonic generator 18 with a power source 19 are provided mounted on the chamber 10 and/or cover 11 so as to irradiate the organic materials 13 in the confined space 12. The laser 14 is aimed at about the center of the organic material 13. An outlet 20 from the confined space 12 is provided with a conduit 21 for the removal of gaseous volatilized products from the organic material 13. Condensers 22 and 23 with receivers 24 and 25 are provided in the conduit 21 for removal of the relatively easily condensed oil components of the volatilization products. The conduit 21 leads to an optional electrolysis unit 26 which condenses some water and acids and then electrolyzes the water to hydrogen and oxygen gases. The electrodes 27 and 28 are powered by a direct current voltage source 29. A catalytic converter 30 with a hydrogenation catalyst is optionally provided at the outlet 31 in conduit 32 from the electrolysis unit 26 in order to react the hydrogen (generated in the unit 26) with unsaturated portions of the remaining uncondensed gaseous volatilization products. A third condenser 33 and receiver 34 is provided to condense higher molecular weight portions in these remaining gaseous volatilization products. The remaining uncondensed gaseous volatilization products are withdrawn through a vacuum pump 35 connected to the outlet 36 of the conduit 32. The product is like natural gas which may be hydrogen enriched.

The destructive volatilization or distillation of the organic material 13 in the confined space 12 is initiated by the laser 14 which irradiates some of the organic material 13 and essentially speeds up molecular motion in the organic material 13 and produces elemental carbon usually while the microwave generator 16 and ultrasonic generator 18 are operating. Care must be taken to move the laser beam into position to irradiate a thin section or alternatively to use a laser generator 14 which can penetrate the organic material 13. Upon initiation of destructive distillation, the laser generator 14 can be shut off. The gaseous volatilization products pass through the outlet 20 into conduit 21 and heavy oil portions which have relatively high molecular weights are condensed in condensers 22 and 23 with the relatively lighter fractions in condenser 23. Various cooling means (not shown) such as forced air or water, can be used to facilitate condensation; however, so far none are needed as the temperature is only about 250° F. The uncondensed portion of the gaseous volatilization products passes into electrolysis unit 26 where some water vapors and acids condense and are electrolyzed by electrodes 27 and 28 to hydrogen and oxygen which mixes with the gases in the unit 26. Optionally hydrogen can be reacted with unsaturated hydrocarbons in the gaseous volatilization products in converter 30 using a hydrogenation catalyst. A portion of the gaseous volatilization product is partially condensed in condenser 33 and the uncondensed gaseous portion is removed through conduit 32, vacuum pump 35 and outlet 36. The combustible gases recovered are essentially low molecular weight hydrocarbons, hydrogen and oxygen, and are usually used together as a fuel.

SPECIFIC EXAMPLE

EXAMPLE 1

The apparatus used in this Example was of laboratory bench scale assembled in the manner of FIG. 2 without the catalytic converter 30. The operability of the process was demonstrated in this manner. For better understanding of the invention, the equivalent structure described in reference to FIG. 2 is shown in parenthesis.

A commercially available food cooking microwave oven (16, 17), powered by 110 volts AC and using 550 watts, which produced microwaves at a frequency of 2450 megaHertz was used. A 250 ml round bottom Pyrex$_{TM}$ single necked flask (10, 12) was provided inside the oven (16, 17) and loosely filled with pieces of a variety of organic materials (13), pre-treated so that large pieces of metals were removed to avoid microwave reflection and destruction of the oven (16, 17), including wood chips and garbage and with aluminum silicate (clay) catalyst particles. A glass tube (21) leading from a stoppered (11) neck of the flask (10, 12) through the side of the oven (16, 17) was connected through an ultrasonic generator (18, 19) having a frequency of 2450 megaHertz and powered by 110 volts AC. Air in the flask (10, 12) and in tube (21) provided the medium for ultrasonic wave irradiation of the contents (13) of the flask (10, 12). A gas laser generator (14, 15) powered by 110 volts AC, drawing 1 watt of power and containing neon gas in the laser tube was mounted adjacent the oven (16, 17), which had an opening in a side for providing the laser beam inside the oven (16, 17), and was aimed at the flask (10, 12) with the organic materials (13). Two Erlenmeyer flasks (22, 23, 24, 25) were provided in series in the tube (21) leading from the ultrasonic generator (18, 19) which were air cooled. An electrolysis unit (26) was provided connected to the tube (21) from the second flask (23, 25). The electrolysis unit (26) included two electrodes (27, 28) powered by 24 volts DC. A tube (32) was provided leading from the electrolysis unit (26) into a third Erlenmeyer flask (33, 34) which also acted as an air cooled condenser. A vacuum pump (35) capable of producing a vacuum of 27 inches of mercury (0.03 atmosphere) was connected to a tube (32) leading from the third flask (33, 34). The pump (35) outlet (36) was connected to a large glass bottle (not shown) which trapped any residue which would condense from the gaseous volatilization products.

In operation, a laser beam from the laser generator (14, 15) irradiates the contents (13) of the round bottom flask (10, 12) for about 1 second to 1 minute to generate elemental carbon in situ and then is deactivated. The ultrasonic (18, 19) and microwave (16, 17) generators were then activated to irradiate the organic materials (13). After about 15 seconds gaseous volatilization products were formed which exited the outlet (20) from the flask (10, 12) through the ultrasonic generator (18, 19) and oils formed as liquids in the first and second flasks (22, 23, 24, 25). If the laser beam did not contact the organic material (13) at an appropriate point or the distilling flask (10, 12) was misplaced, the process did not start and the procedure had to be repeated. Water accumulated in the electrolysis unit (26) which was then electrolyzed to hydrogen and oxygen. The third flask (33, 34) condensed another portion of the gaseous volatilization products and the remaining gaseous volatilization products were vented through the vacuum pump (35) and recovered. The operating temperature of the flask (10, 12) in the oven (16, 17) was about 200° F. (93.3° C.) which is very low.

In multiple process runs, the cumulative results set forth in Table I were achieved.

TABLE I

Input:
67 pounds (30.5 kg) total: 20% tires; 5% wood; and 75% garbage from dump (percents by weight)
BTU per pound: 7,051 BTU/lb (3913 gram calories/gram)
Total BTU: 472,417 BTU in 67 lb. (1.185 × 10$^8$ calories)
Output:
Gas from the process: 450 cubic feet (12.6 cubic meters)
22.5 pounds (10.2 kg)
454 BTU/cubic foot (4040 kg calories per cubic meter)
204,300 BTU (5.127 × 10$^7$ calories)
Oil in the condensers: 10 pounds (5.55 kg) 10,510 BTU/lb-105,100 BTU (2.64 × 10$^7$ calories)
Charcoal in the chamber: 34 pounds (15.4 kg)
4,000 BTU/lb-136,000 BTU (3.41 × 10$^7$ calories)
Energy Recovered: 445,400 BTU (1.12 × 10$^8$ calories)
Energy Recovery (based upon organic material input energy available): 95% or more
Composition of gas from the process (average)

| Component | Mole Percents |
| --- | --- |
| Hydrogen | 26 |
| CO | 4 |
| CO$_2$ | 17 |
| N$_2$ | 19 |
| CH$_4$ | 25 |
| CH$_3$CH$_3$ | 4 |
| Propane | 0.9 |
| Argon | 0.5 |
| Oxygen | 3.5 |

Heat of Combustion:
BTU/cu. ft.: 454 (4040 kg calories per cubic meter)

The process converts coal (which contains significant amounts of organic materials), wood, tires, plastics and garbage and other organic wastes to gas, crude oil and charcoal. The process operates with low heat emission and at low pressure compared to prior art pyrolytic processes. It is a closed system and thus is non-polluting.

The chemistry of the process is not completely understood. When the organic materials are irradiated by the laser beam or other initiator, the energy is absorbed in thin section portions thereof and activates molecular motion in the organic material to produce elemental carbon. Essentially there is a point initiation of the destructive distillation. The ultrasonic and microwave generators upon activation begin to produce gaseous volatilization products from the organic material in about 15 seconds. The product at this stage contains water, hydrocarbons, particulate carbon and various carbon, oxygen, nitrogen, sulfur and halogen containing compounds. The polymers, wood, garbage and the like are essentially destructively distilled leaving a carbon (charcoal-like) residue in the confined space. The process can tolerate up to about thirty-percent (30%) water in the organic materials. A reducing atmosphere is preferably maintained in the confined space. Unexpectedly, the process of the present invention is essentially complete in about 23 minutes or less, if the preferred procedure is followed.

The ultrasonic generator provides increased removal of the gaseous volatilization products from the destructive distillation of the organic materials and possibly produces some sonochemical destructive changes in the gaseous volatilization products and/or organic materials. The microwaves essentially provide the energy for the destructive distillation.

The electrolysis unit is an important preferred feature of the process in that it acts to provide oxygen for the oxidation of carbon and carbon monoxide and essentially cleans the "soot" or carbon from the gaseous volatilization products. Hydrogen thus generated increases the fuel value of the gaseous volatilization product. There are also traces of unsaturated hydrocarbons in the volatilization products from the electrolysis unit which can be hydrogenated in the presence of a hydrogenation catalyst in a catalytic converter so as to eliminate them.

As can be seen from the foregoing description, the process of the present invention is simple and economical and the apparatus is easily constructed. Numerous variations will occur to those skilled in the art.

I claim:

1. The process for the destructive distillation of high molecular weight organic materials to produce volatilization products which comprises:
    (a) providing high molecular weight organic materials in a confined space irradiatable by multiple wave energy sources including microwave and ultrasonic generators as the wave energy sources and with a conduit connected to an outlet from the confined space for removal of volatilization products;
    (b) irradiating the organic materials simultaneously with the multiple wave energy sources including microwave and ultrasonic radiation in the presence of separated elemental carbon in the organic materials in an amount sufficient to produce an electrical discharge between the separated carbon in the confined space so as to produce volatilization products including carbon soot by destructive distillation of the organic materials; and
    (c) recovering the volatilization products from the conduit and a carbonized residue from the confined space.

2. The process of claim 1 wherein microwave absorptive particles are added to the organic material selected from an aluminum silicate, carbon or a metal in an amount between about 0.1 to 2.0 percent by weight.

3. The process of claim 1 wherein the ultrasonic waves have a wave frequency of at least about 2400 kiloHertz and are powered between about 5 and 100 watts.

4. The process of claim 1 wherein the microwaves have a wave frequency of 915 or 2450 megaHertz with a power which can be varied between about 100 and 1500 watts.

5. The process of claim 1 including recovering portions of the volatilization products as liquids by means of air cooled condensers in the conduit in multiple receivers from the condensers, removing the carbon soot and then recovering the remaining portion as gaseous volatilization products from the conduit.

6. The process of claim 1 wherein a reduced pressure is provided in the confined space sufficient to increase the rate of formation of the volatilization products.

7. The process of claim 1 wherein a laser beam generator is utilized to irradiate a portion of the high molecular weight organic materials to produce heated elemental carbon and then the organic materials are irradiated with the ultrasonic waves and microwaves.

8. The process of claim 7 wherein the laser beam is of sufficient intensity to penetrate organic materials which are essentially solid.

9. The process of claim 8 wherein the laser beam has a power between about 1 milliwatt and 1500 watts and a wave frequency of between about 50 Hertz and 500 kiloHertz.

10. The process of claim 1 wherein prior to recovering the volatilization products, water in the volatilization products in the conduit is electrolyzed so as to decompose the water into hydrogen and oxygen which are then reacted with the carbon soot and the other volatilization products.

11. The process of claim 10 including the step of condensing a portion of the volatilization products from the electrolysis as a liquid and recovering a remaining gaseous portion from an outlet from a pump which produces a reduced pressure in the conduit and in the confined space.

12. The process of claim 10 wherein the hydrogen from the electrolysis is reacted in a catalytic converter containing a hydrogenation catalyst with a portion of the volatilization products.

13. The process of claim 10 wherein a portion of the water in the volatilization products is condensed for the electrolysis.

14. An apparatus useful for the destructive distillation of high molecular weight organic materials into gaseous volatilization products which comprises:
    (a) a chamber defining a confined space including a cover for introducing and then sealing the organic materials in the confined space;
    (b) an outlet from the chamber for attachment of a conduit for removal of the volatilization products from the confined space, said conduit being provided with condensers for recovering some of the volatilization products as liquids, with means for removing carbon soot and with means for removal and recovery of gaseous volatilization products which are uncondensed;
    (c) means located at an outlet from said conduit for reducing the pressure in the confined space; and (d) generating means in association with the chamber for providing wave energy in the confined space including ultrasonic and microwave generators, wherein the simultaneously produced combined wave energy of the ultrasonic and microwave generators is sufficient to produce destructive distillation of the organic materials in the presence of separated elemental carbon in the organic materials in an amount sufficient to produce an electrical discharge between the separated carbon and to produce volatilization products including carbon soot.

15. The apparatus of claim 14 wherein the ultrasonic generator produces a wave frequency of at least about 20 kiloHertz and has a power between 5 and 100 watts.

16. The apparatus of claim 14 wherein the microwave generator produces a wave frequency in the range of 300 megaHertz and 300 gigaHertz and has a power which can be varied between about 100 and 1500 watts.

17. The apparatus of claim 16 wherein the wave frequency is 915 or 2450 megaHertz.

18. The apparatus of claim 14 wherein an electrolysis unit is provided in the conduit between the condensers and the reduced pressure means to electrolyze water from the volatilization products to hydrogen and oxygen which then are reacted with the carbon soot and the other volatilization products.

19. The apparatus of claim 14 wherein an additional condenser is provided in the conduit downstream of the electrolysis unit for condensing a further portion of the volatilization products.

20. The apparatus of claim 18 wherein the electrolysis unit includes means for condensing water from the volatilization products for the electrolysis.

21. The appartus of claim 18 wherein a catalytic converter containing a hydrogenation catalyst is provided in the conduit downstream of the electrolysis unit for reacting the hydrogen with the volatilization products.

22. An apparatus useful for the destructive distillation of high molecular weight organic materials into gaseous volatilization products which comprises:

(a) a chamber defining a confined space including a cover for introducing and then sealing the organic materials in the confined space;

(b) an outlet connector from the chamber for attachment of a conduit for removal of the volatilization products from the confined space;

(c) a laser beam generator provided with the beam directed so as to irradiate a portion of the high molecular weight organic materials in said confined space to produce heated elemental carbon, said laser beam generator having a power of between 100 and 1500 watts and producing a wave frequency of between about 50 Hertz and 500 kiloHertz; and (d) generating means in association with the chamber for providing wave energy in the confined space including ultrasonic and microwave generators, wherein the simultaneously produced combined wave energy of the ultrasonic and microwave generators is sufficient to produce destructive distillation of the organic materials in the presence of separated elemental carbon in the organic materials in an amount sufficient to produce an electrical discharge between the separated carbon and to produce volatilization products including carbon soot.

* * * * *